(12) United States Patent
Dev

(10) Patent No.: US 12,035,414 B2
(45) Date of Patent: *Jul. 9, 2024

(54) INTERNET GATEWAY PROVISIONING AND EVALUATION OF EMBEDDED SUBSCRIBER IDENTITY MODULE PRIVILEGES

(71) Applicant: DISH Network L.L.C., Englewood, CO (US)

(72) Inventor: Abeir Dev, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,868

(22) Filed: May 19, 2023

(65) Prior Publication Data

US 2023/0292101 A1  Sep. 14, 2023

Related U.S. Application Data

(63) Continuation of application No. 17/129,210, filed on Dec. 21, 2020, now Pat. No. 11,678,171.

(51) Int. Cl.
| | |
|---|---|
| *H04W 8/18* | (2009.01) |
| *H04W 8/20* | (2009.01) |
| *H04W 12/06* | (2021.01) |
| *H04W 12/082* | (2021.01) |
| *H04W 84/12* | (2009.01) |

(Continued)

(52) U.S. Cl.
CPC .......... *H04W 8/183* (2013.01); *H04W 8/205* (2013.01); *H04W 12/06* (2013.01); *H04W 12/082* (2021.01); *H04W 84/12* (2013.01); *H04W 88/06* (2013.01); *H04W 88/16* (2013.01)

(58) Field of Classification Search
None
See application file for complete search history.

(56) References Cited

U.S. PATENT DOCUMENTS

| | | |
|---|---|---|
| 10,194,320 B1 | 1/2019 | Egner et al. |
| 11,057,827 B1 | 7/2021 | Dreiling et al. |
| 11,115,810 B1 | 9/2021 | Indurkar |

(Continued)

OTHER PUBLICATIONS

GSM Association, "Official Document SGP.22-SGP.22 RSP Technical Specification," Version 2.2.2, Jun. 5, 2020. (268 pages).

(Continued)

*Primary Examiner* — Bob A Phunkulh
(74) *Attorney, Agent, or Firm* — Seed IP Law Group LLP

(57) ABSTRACT

Internet gateway provisioning and evaluation of embedded subscriber identity module (eSIM) privileges is provided. The Internet gateway receives, from a device, a request to provision an embedded subscriber identity module (eSIM) of the device. The Internet gateway, in response to receiving the request to provision the eSIM of the device, causes the eSIM of the device to be provisioned with a profile. Provisioning the eSIM gives the device an ability to authenticate with a base station for communicating, via the base station, over a cellular communication protocol. The Internet gateway, after causing the eSIM to be provisioned, determines whether at least one criterion is met. The at least one criterion is for retaining or denying the ability of the device to authenticate with the base station. The Internet gateway, sends data, to a server, indicating that the at least one criterion is met.

20 Claims, 4 Drawing Sheets

(51) Int. Cl.
*H04W 88/06* (2009.01)
*H04W 88/16* (2009.01)

(56) References Cited

U.S. PATENT DOCUMENTS

| | | |
|---|---|---|
| 11,310,654 B1 | 4/2022 | Indurkar |
| 11,398,883 B2 | 7/2022 | Ganesan et al. |
| 2014/0051423 A1 | 2/2014 | Marsden et al. |
| 2017/0338954 A1 | 11/2017 | Yang et al. |
| 2018/0014178 A1 | 1/2018 | Baek et al. |
| 2018/0176768 A1 | 6/2018 | Baek et al. |
| 2019/0253563 A1 | 8/2019 | Ullah et al. |
| 2019/0349743 A1 | 11/2019 | Hamblet |
| 2020/0178070 A1 | 6/2020 | Yang et al. |
| 2020/0252791 A1 | 8/2020 | Hamblet |
| 2020/0314628 A1 | 10/2020 | Panchal et al. |
| 2020/0322884 A1 | 10/2020 | Di Girolamo et al. |
| 2021/0076204 A1 | 3/2021 | Goyal et al. |
| 2021/0112382 A1 | 4/2021 | Oswal et al. |
| 2022/0141642 A1 | 5/2022 | Boyapalle et al. |
| 2022/0201463 A1 | 6/2022 | Dev |

OTHER PUBLICATIONS

International Search Report and Written Opinion, dated Mar. 7, 2022, for International Application No. PCT/US2021/064081. (18 pages).

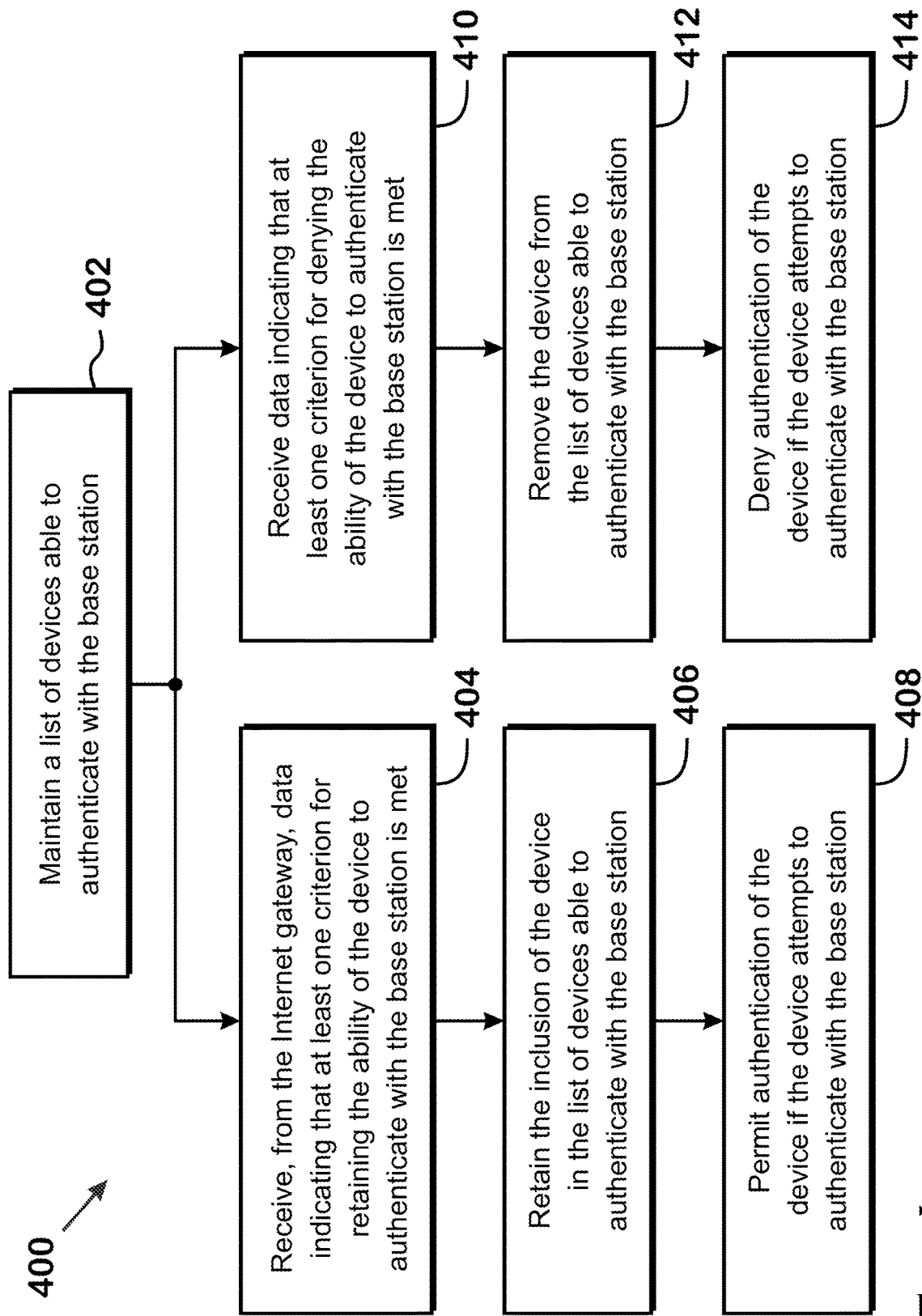

INTERNET GATEWAY PROVISIONING AND EVALUATION OF EMBEDDED SUBSCRIBER IDENTITY MODULE PRIVILEGES

BACKGROUND

Technical Field

The present application is related to an Internet gateway provisioning and evaluating embedded subscriber identity module (eSIM) privileges of a device to give or revoke an ability of the device to communicate over a base station.

Description of the Related Art

The proliferation of eSIM-enabled devices resulted in the replacement of physical SIM cards and giving subscribers instant connectivity to communication networks. eSIMs permit remote or "over-the-air" provisioning by carriers of communication plan privileges. Further, an eSIM allows a device to have multiple profiles without swapping physical cards or allocating space for multiple cards. The flexibility of remote provisioning gives service providers wide ranging capability in configuring the services offered to their customers and subscribers on various devices of the customers and subscribers.

BRIEF SUMMARY

In an embodiment, an Internet gateway includes a receiver configured to receive, from a device, a request to provision an embedded subscriber identity module (eSIM) of the device. The Internet gateway includes a processor configured to in response to receiving the request to provision the eSIM of the device, cause the eSIM of the device to be provisioned with a profile. Provisioning the eSIM giving the device an ability to authenticate with a base station for communicating, via the base station, over a cellular communication protocol. The processor configured to after causing the eSIM to be provisioned, determine whether at least one criterion is met, the at least one criterion being for retaining the ability of the device to authenticate with the base station or denying the device the ability to authenticate with the base station and in response to determining that the at least one criterion is met, output data indicating that the at least one criterion is met. The Internet gateway includes a transmitter configured to transmit the data indicating that the at least one criterion is met.

In an embodiment, the Internet gateway is configured to provide Internet coverage using over a local area network (LAN) communication protocol and the receiver is configured to receive the request over the LAN communication protocol. In an embodiment, the LAN communication protocol is an Institute of Electrical and Electronics Engineers (IEEE) 802.11 communication protocol. In an embodiment, the device is configured to access the Internet via the Internet gateway and over the LAN communication protocol when the device is within a proximity of the Internet gateway.

In an embodiment, the data indicating that the at least one criterion is met is addressed to a server, and the server is configured to maintain a list of devices able to authenticate with the base station. In an embodiment, the server is configured to keep the device in the list of devices able to authenticate with the base station if the at least one criterion is for retaining the ability of the device to authenticate with the base station.

In an embodiment, the server is configured to remove the device from the list of devices able to authenticate with the base station if the at least one criterion is for denying the device the ability to authenticate with the base station. In an embodiment, the at least one criterion for retaining the ability of the device to authenticate with the base station is met when the device has communicated with the Internet gateway at least a minimum number of times in a preceding duration of time, or the at least one criterion for denying the device the ability to authenticate with the base station is met when the device has not communicated with the Internet gateway at least a minimum number of times in a preceding duration of time.

In an embodiment, the at least one criterion for retaining the ability of the device to authenticate with the base station is met when the device has communicated with the Internet gateway at least a minimum number of times during specified hours of the day in a preceding duration of time, or the at least one criterion for denying the device the ability to authenticate with the base station is met when the device has not communicated with the Internet gateway at least a minimum number of times during specified hours of the day in a preceding duration of time.

In an embodiment, a server includes memory configured to store a list of a plurality of devices able to authenticate with a base station. The list of the plurality of devices includes a first device. In an embodiment, the server includes a receiver configured to receive, from an Internet gateway, data indicating that at least one criterion for retaining the ability of the first device to authenticate with the base station or revoking the ability of the first device to authenticate with the base station is met. In an embodiment, the server includes a processor configured to in response to receiving the data indicating that at least one criterion for retaining the ability of the first device to authenticate with the base station is met, retain an inclusion of the first device in the list of the plurality of devices and permit authentication of the first device by the base station.

In an embodiment, the processor is configured to, in response to receiving the data indicating that at least one criterion for revoking the ability of the first device to authenticate with the base station is met, remove the first device from the list of the plurality of devices and deny authentication of the first device by the base station. In an embodiment, permitting authentication of the first device by the base station includes receiving a request, from the base station, inquiring whether the first device is to be authenticated, in response to receiving the request, determining that the first device is included in the list of the plurality of devices and sending a response to the base station indicating that the first device is to be authenticated by the base station.

In an embodiment, denying authentication of the first device by the base station includes receiving a request, from the base station, inquiring whether the first device is to be authenticated, in response to receiving the request, determining that the first device is not included in the list of the plurality of devices and sending a response to the base station indicating that the first device is not to be authenticated by the base station.

In an embodiment, the receiver is configured to receive, from the Internet gateway, a request to include the first device in the list. In an embodiment, the Internet gateway is configured to send the request in response to provisioning an embedded subscriber identity module (eSIM) of the first device due to a proximity of the first device to the Internet gateway.

In an embodiment, a method includes receiving, by an Internet gateway from a device, a request to provision an embedded subscriber identity module (eSIM) of the device, and in response to receiving the request to provision the eSIM of the device, causing the eSIM of the device to be provisioned with a profile. In an embodiment, provisioning the eSIM gives the device an ability to authenticate with a base station for communicating, via the base station, over a cellular communication protocol. In an embodiment, the method includes after causing the eSIM to be provisioned, determining whether at least one criterion is met, the at least one criterion being for retaining the ability of the device to authenticate with the base station or denying the device the ability to authenticate with the base station and in response to determining that the at least one criterion is met, sending data, to a server, indicating that the at least one criterion is met. In an embodiment, the method includes providing, by the Internet gateway, Internet coverage using over a local area network (LAN) communication protocol and receiving the request over the LAN communication protocol. In an embodiment, the LAN communication protocol is an Institute of Electrical and Electronics Engineers (IEEE) 802.11 communication protocol. In an embodiment, the method includes maintaining, by the server, a list of devices able to authenticate with the base station. In an embodiment, the method includes retaining, by the server, the device in the list of devices able to authenticate with the base station if the at least one criterion is for retaining the ability of the device to authenticate with the base station.

In an embodiment, the method includes removing, by the server, the device from the list of devices able to authenticate with the base station if the at least one criterion is for denying the device the ability to authenticate with the base station. In an embodiment, the at least one criterion for retaining the ability of the device to authenticate with the base station is met when the device has communicated with the Internet gateway at least a minimum number of times in a preceding duration of time, or the at least one criterion for denying the device the ability to authenticate with the base station is met when the device has not communicated with the Internet gateway at least a minimum number of times in a preceding duration of time.

In an embodiment, the at least one criterion for retaining the ability of the device to authenticate with the base station is met when the device has communicated with the Internet gateway at least a minimum number of times during specified hours of the day in a preceding duration of time, or the at least one criterion for denying the device the ability to authenticate with the base station is met when the device has not communicated with the Internet gateway at least a minimum number of times during specified hours of the day in a preceding duration of time.

BRIEF DESCRIPTION OF THE SEVERAL VIEWS OF THE DRAWINGS

FIG. 4 shows a flow diagram of a method for updating a list of devices able to authenticate with a base station.

DETAILED DESCRIPTION

Figure 1:
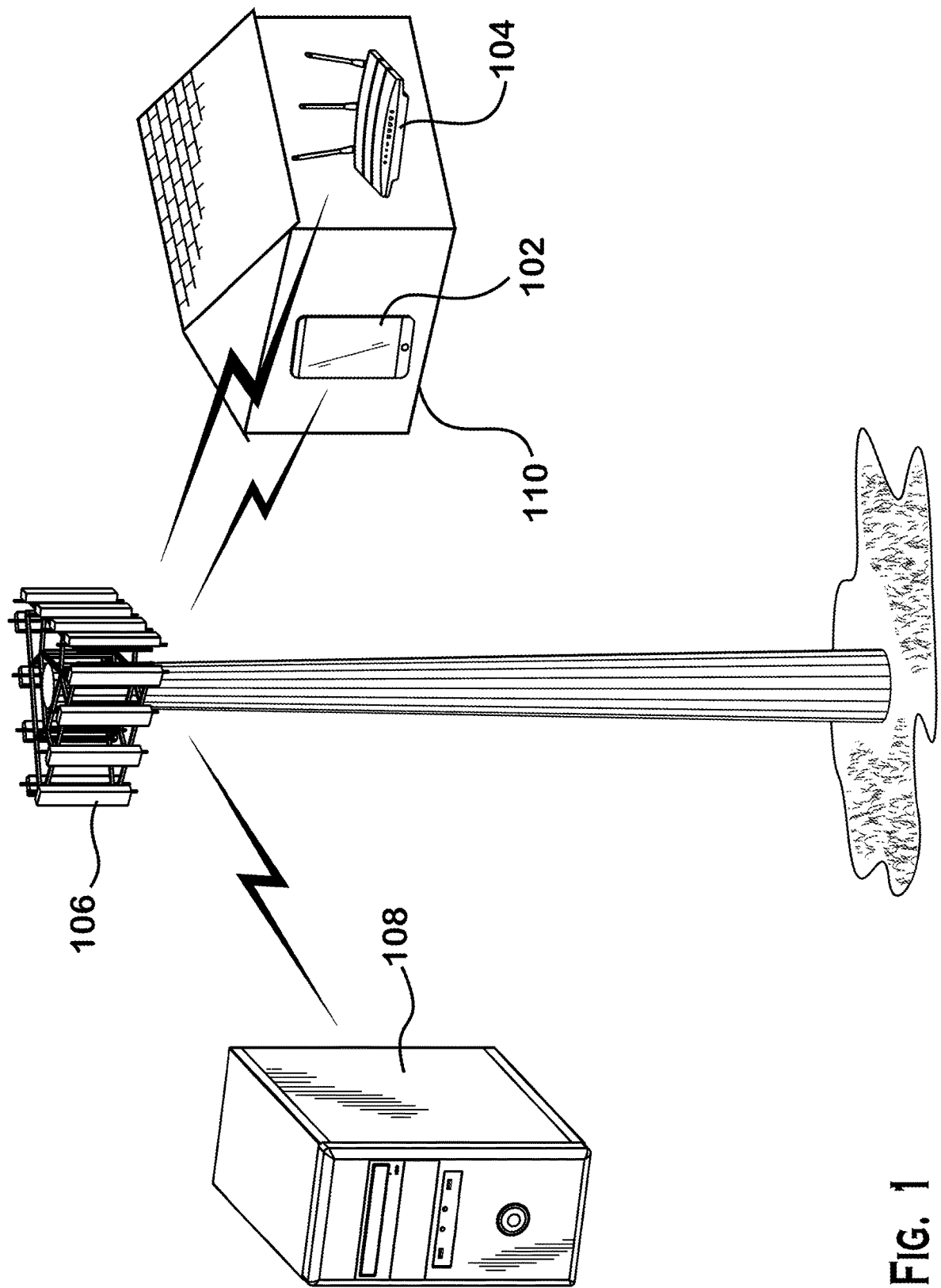
FIG. 1 shows an environment for configuring an embedded subscriber identity module (eSIM) of a device.

FIG. 1 shows an environment 100 for configuring an embedded subscriber identity module (eSIM) of a device 102. The environment 100 has the device 102, a gateway 104, a base station 106 and a server 108. The device 102 may be any type of device, such as a consumer electronics device. For example, the device 102 may be a smartphone, a tablet, a smart watch or a laptop, among others. In addition, the device 102 may be an Internet of Things (IoT) device, such as a smart earphone, a smart meter or video surveillance devices, among others. The device 102 may be have eSIM (a SIM card or chip that is embedded directly therein). The eSIM is remotely (or "over the air") provisionable, for example, as provided in GSM Association Document SGP.22 RSP Technical Specification, Version 2.2.2, Jun. 5, 2020. In addition to an initial subscription provisioning, subsequent changes from one operator to another may be made.

The gateway 104 may be any device configured to traffic data between the base station 106 and other devices, such as devices positioned in a proximity of the gateway 104 or the structure 110. The gateway 104 may provide Internet coverage for the devices positioned in the proximity of the gateway 104 or the structure 110. The gateway 104 may be configured to operate using two different communications protocols. The gateway 104 may be configured to communicate with the devices positioned in the proximity of the gateway 104 or the structure 110 over a local area network (LAN) communication protocol for providing local area networking and Internet access. The LAN communication protocol may be one of the Institute of Electrical and Electronics Engineers (IEEE) 802.11 family of standardized communication protocols (or Wi-Fi) or an Ethernet protocol, among others. The gateway 104 may be configured to communicate with the base station 106 over a fifth generation (5G) protocol of the 3rd Generation Partnership Project (3GPP). Thus, Internet data is transmitted from the devices via the gateway 104 to the base station 106 and from the base station 106 to other networking infrastructure (not shown) and vice-versa. The gateway 104 may, for example, be a modem or router acting as an intermediary or a hop between the base station 106 and another device. The gateway 104 may pass data traffic, filter the traffic, act as a proxy or perform protocol translation. The gateway 104 may have a firewall to block unwanted traffic or unauthorized devices from a closed network.

The base station 106 may be any device configured to provide cellular coverage for a geographic area, such as 5G coverage. The base station 106 may provide the coverage for various gateways, for example, used in subscriber's homes or businesses, as well as devices, such as the device 102, whether in the proximity of a gateway or not.

The server 108 may be any type of computing system managed by a provider of Internet services (for example, an Internet service provider (ISP)). The server 108 may have storage, such as a memory, configured to store a list of identifiers of eSIMs provisioned (for example, by the provider). The list may be a "white list" of identifiers of eSIMs, eSIM profiles or identifiers of eSIM profiles permitted by the provider to access the communication network (for example, 5G network) of the base station 106. If the device 102 has an eSIM eSIM profile or identifier of eSIM profile listed or identified on the list, the device 102 has access to the coverage provided by the base station 106. Conversely, the device 102 does not have access to the network.

The gateway 104, base station 106 and server 108 may be managed by the provider to provide connectivity to subscribers. The subscriber's devices may obtain access to the Internet or voice data by communicating with the gateway 104 when they are in a proximity of the gateway 104.

Alternatively, the subscriber's devices may obtain the access by communicating with the base station 106 when they are not in a proximity of the gateway 104 or within the range of the gateway 104.

Figure 2:
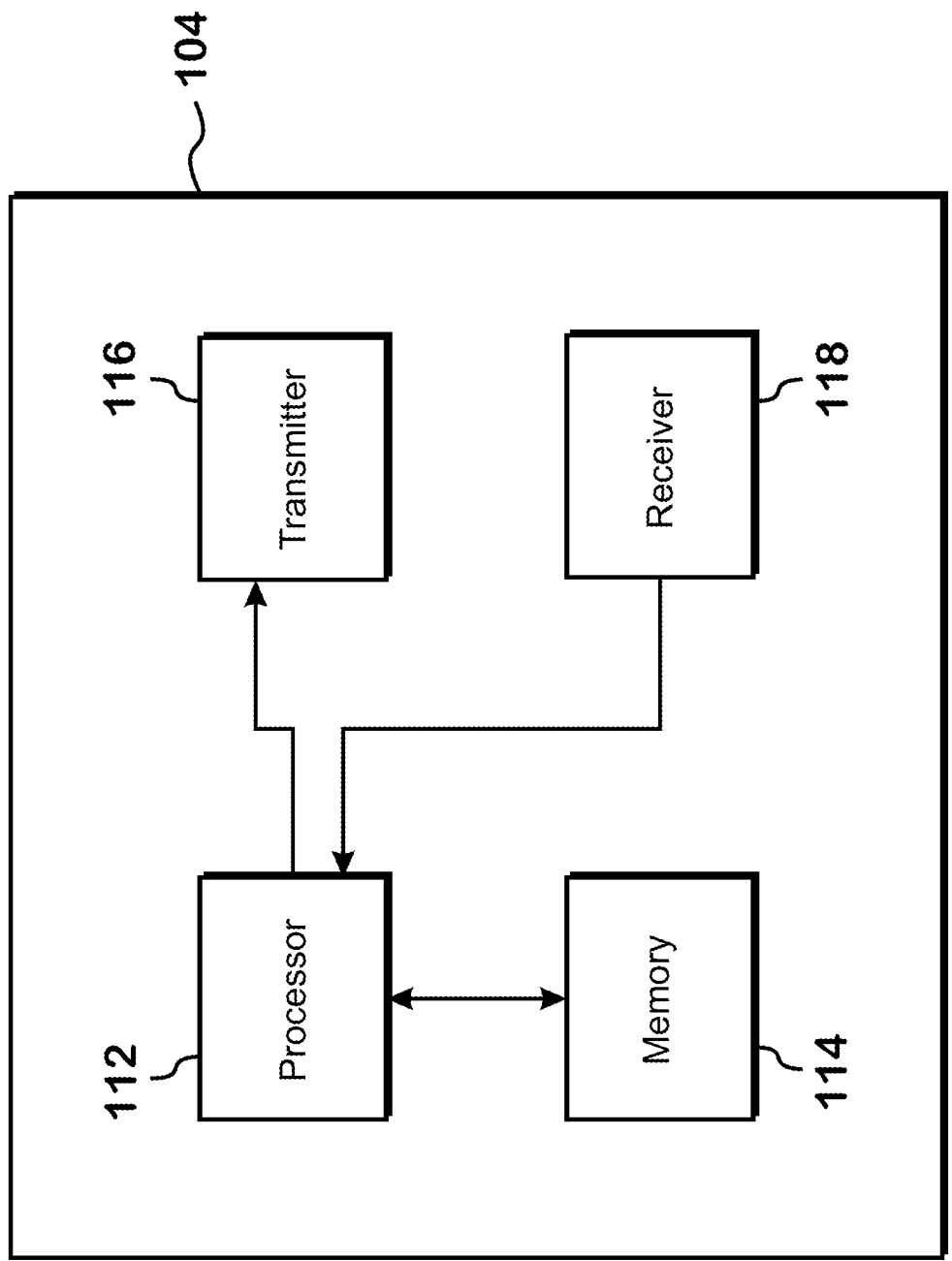
FIG. 2 shows a block diagram of the gateway.

FIG. 2 shows a block diagram of the gateway 104. The gateway 104 includes a processor 112, memory 114, a transmitter 116 and the receiver 118. The processor 112 may be any type of device that is configured to execute instructions (computer-executable instructions) that cause the processor 112 to operate as described herein. For example, the processor may be a controller or a microcontroller and may include a central processing unit (CPU) or any other type of processing unit. The memory 114 may be any type of non-transitory computer-readable storage medium. The memory 114 may be read-only memory (ROM) or random access memory (RAM), among others. Further, the memory 114 may be static or dynamic. The memory 114 stores the computer-executable instructions that may be retrieved or accessed by the processor 112 for execution. The computer-executable instructions, when executed by the processor 112, cause the processor 102 (and the gateway 104) to operate as described herein.

The transmitter 116 may be any type of device that is operable to transmit data to another device. The transmitter 116 may be configured to communicate using any type of communication protocol. The protocol may be a cellular communication protocol, such as long term evolution (LTE), or a wireless communication protocol, such as the Institute of Electrical and Electronics Engineers (IEEE) 802 protocol, among others. The gateway 104 may have two transmitters; a first transmitter configured to transmit data to the base station 106, for example, over a 5G communication protocol, and a second transmitter configured to transmit data to devices within the proximity of the gateway 104, for example, over an IEEE 802 protocol or Ethernet protocol, among others. Alternatively, a single transmitter may operate according to multiple protocols.

The receiver 118 may be any type of device that is operable to receive data from another device. Like the transmitter 116, the receiver 118 may be configured to communicate using any type of communication protocol. The gateway 104 may have two receivers; a first receiver configured to receive data from the base station 106, for example, over a 5G communication protocol, and a second receiver configured to receive data from devices within the proximity of the gateway 104, for example, over the IEEE 802 protocol or Ethernet protocol, among others. The device 102 and the server 108 may be similarly configured to the gateway 104.

Figure 3:
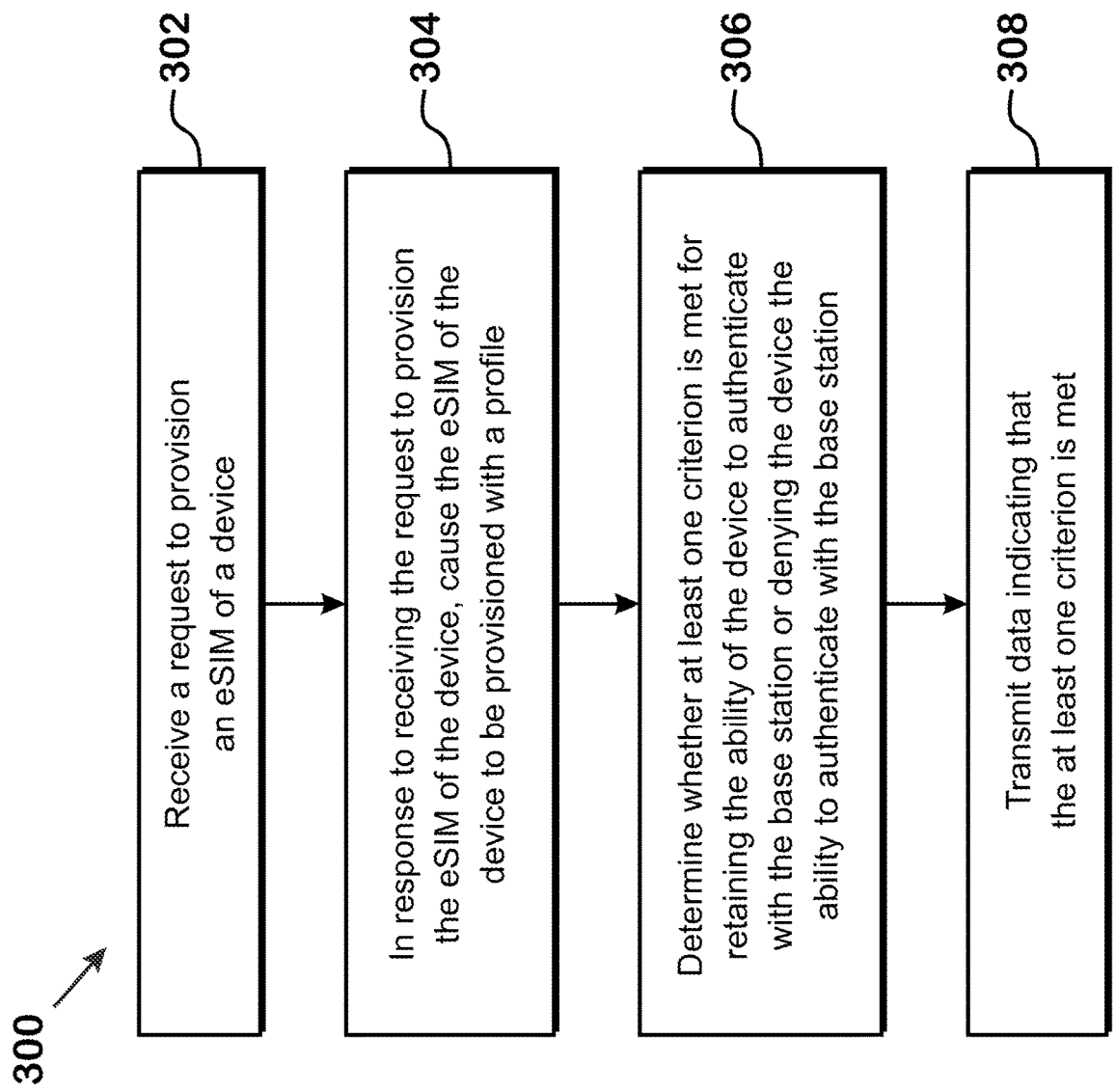
FIG. 3 shows a flow diagram of a method for provisioning an eSIM of a device.

FIG. 3 shows a flow diagram of a method 300 for provisioning an eSIM of a device. The method 300 also includes evaluating whether the device, such as the device 102, is qualified to continue communicating as provided by the provisioned eSIM (or evaluating whether the device should remain to be "whitelisted"). The method 300 includes, at 302, receiving, by an Internet gateway, such as the Internet gateway 104, a request to provision an eSIM of the device. As described herein, the device may be in a proximity of the Internet gateway. The device may belong to or be associated with a subscriber of Internet services provided by the Internet gateway. As part of the subscription, the subscriber may have devices thereof provisioned for base station-provided services, such as voice and/or internet services. The request may initiate a pairing procedure.

The Internet gateway, or a processor thereof, in response to receiving the request to provision the eSIM of the device, causes the eSIM of the device to be provisioned with a profile at 304. Provisioning the eSIM may include writing the profile (for example, the profile of the operator) to the eSIM. The profile may include a key, an integrated circuit card identifier (ICCID) and/or an international mobile subscriber identity (IMSI), among others. Provisioning the eSIM gives the device an ability to authenticate with a base station, such as the base station 106, for communicating, via the base station, over a cellular communication protocol. The device uses the profile and/or a key or identifier thereof to connect to the base station. Thus, if the device is not within (or is outside) the proximity of the Internet gateway, the device may receive data/voice services using the base station.

The device may not be provisioned indefinitely. It is sought to perform checks, for example, periodic or according to a set schedule, to determine whether the device remains associated with the subscriber. For example, if the device is used to communicate with the Internet gateway, the communication may be used as indicia that the device remains associated with a confirmed subscriber. Accordingly, the ability of the device to authenticate with the base station is retained. Conversely, the ability of the device to authenticate with the base station is reversed (e.g., by removing the device from a list of devices able to authenticate with the base station).

At 306, the Internet gateway determines whether at least one criterion is met for retaining the ability of the device to authenticate with the base station or denying the device the ability to authenticate with the base station. The at least one criterion for retaining the ability may be met when the device has communicated with the Internet gateway at least a minimum number of times in a preceding duration of time (for example, once, twice or three times in the last week, one month or two months). The at least one criterion for retaining the ability may be the fact that the device communicated ("checked in") with the Internet gateway. The at least one criterion for retaining the ability may be met in response to the device communicating with the Internet gateway.

The at least one criterion for denying the device the ability to authenticate with the base station may be met when the device has not communicated with the Internet gateway at least a minimum number of times in a preceding duration of time (for example, once, twice or three times in the last week, one month or two months).

In addition, the at least one criterion for retaining the ability of the device to authenticate with the base station may be met when the device has communicated with the Internet gateway at least a minimum number of times during specified hours of the day in a preceding duration of time (for example, once, twice or three times during the evening and early morning hours of 9p.m. to 9a.m. in the last week, one month or two months). Conversely, the at least one criterion for denying the device the ability to authenticate may be met when the device has not communicated with the Internet gateway at least a minimum number of times during specified hours of the day in a preceding duration of time. The Internet gateway identifies at a time associated with evaluating whether the at least one criterion is met. The time may be a timestamp at which the at least one criterion is evaluated or a time, day, week or month when the at least one criterion is evaluated. For example, if the device communicates with the Internet gateway, the criterion may be met and the time associated with evaluation of the criterion may be a time when the device communicated with the Internet gateway.

At 308, the Internet gateway, in response to determining that the at least one criterion is met, transmits data indicating that the at least one criterion is met. For example, the processor of the Internet gateway may output the data to the transmitter and the transmitter may transmit the data. The Internet gateway may send a time (or timestamp) associated with evaluating the at least one criterion. Thus, the server receiving the time may use the time as basis for extending or revoking device privileges. The Internet gateway may also send an identity of the device, such as an identity of profile, key, ICCID and/or an IMSI. Thus, the server may associate the at least one criterion and/or time with the device.

FIG. 4 shows a low diagram of a method 400 for updating a list of devices able to authenticate with a base station. In the method 400, a server, such as the server 108, maintains a list of devices able to authenticate with the base station at 402. The list may include an identity of the device, such as an IMEI of the device, a serial number of the device, an identifier of the eSIM of the device, or an identifier of the profile used to provision the eSIM, among others. The server may store the list in a memory of the server.

The server, at 404, receives, from the Internet gateway, data indicating that at least one criterion for retaining the ability of the device to authenticate with the base station is met. The data may include an identifier of the device. In response to receiving the data, the server, at 406, retains the inclusion of the device in the list of devices able to authenticate with the base station. The server, at 408, permits authentication of the device if the device attempts to authenticate with the base station (for communicating with the base station). Alternatively, in response to retaining the inclusion of the device in the list, at least the device is not denied authentication for lacking association with a recognized customer.

When the device attempts to communicate with the base station, the base station identifies the device (for example, using a handshake protocol). The base station then sends a request to the server inquiring as to whether the device is to be authenticated. The server determines whether the device (or an identifier thereof) is part of the list. If the device is part of the list, the server responds to the base station that the device is to be authenticated for communication with the base station and for services provided by the base station.

The server, at 410, receives, from the Internet gateway, data indicating that at least one criterion for denying the ability of the device to authenticate with the base station is met. The data may include an identifier of the device. In response to receiving the data, the server, at 412, removes the device (or an identifier thereof) from the list of devices able to authenticate with the base station or, alternatively, places the device on another list of devices having their privileges revoked. The server, at 414, denies authentication of the device if the device attempts to authenticate with the base station (for communicating with the base station). Alternatively, in response to removing the device, the device is denied authentication for lacking association with a recognized customer.

When the device attempts to communicate with the base station, the base station identifies the device (for example, using a handshake protocol). The base station then sends a request to the server inquiring as to whether the device is to be authenticated. The server determines whether the device (or an identifier thereof) is part of the list. If the device is not part of the list, the server responds to the base station that the device should not be authenticated for communication with the base station and for services provided by the base station. The base station denies communication services to the device.

The Internet gateway 104 may determine whether the at least one criterion for retaining the ability of the device to authenticate with the base station or denying the device the ability to authenticate with the base station is met periodically (for example, every week, one month or two months). Further, the Internet gateway 104 may determine whether the at least one criterion whenever the device is due for removal from the list of devices able to authenticate with the base station. For example, in response to determining that the at least one criterion for retaining the ability of the device to authenticate is met, the device may be retained on the list for a period of time (for example, two months). The device may be renewed for the period of time following the time and/or timestamp associated with the evaluation of the at least one criterion. When the period of time nears ending (for example, 80% or 90% of period of time elapses), the Internet gateway evaluates the at least one criterion. Thus, if the period of time is sixty days, the Internet gateway may evaluate the at least one criterion when forty eight days (80%) or fifty four days (90%) have elapsed since the last reevaluation of the at least one criterion. The evaluations informs whether the privileges associated with the earlier eSIM provisioning are to be maintained and/or extended. Thus, if the device is moved outside of the proximity (range) of the Internet gateway, communication automatically failover from the Internet gateway to the base station occurs.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    storing a list including a plurality of devices able to authenticate with a base station, the list including a device having an embedded subscriber identity module (eSIM) that is provisioned by an Internet gateway with a profile that gives the device an ability to authenticate with the base station for communicating, via the base station, over a cellular communication protocol;
    receiving, from the Internet gateway, data indicating that at least one criterion for retaining the ability of the device to authenticate with the base station or revoking the ability of the device to authenticate with the base station is met, the data being received after the eSIM is provisioned, and the Internet gateway determining that the at least one criterion is met by evaluating communications between the device and the Internet gateway that occur after the eSIM is provisioned; and
    in response to receiving the data indicating that the at least one criterion for retaining the ability of the device to authenticate with the base station is met, retaining an inclusion of the device in the list and permitting authentication of the device by the base station, or in response to receiving the data indicating that at least one criterion for revoking the ability of the device to authenticate with the base station is met, removing the device from the list and denying authentication of the device by the base station.

2. The method of claim 1, wherein denying authentication of the device by the base station includes:

receiving a request, from the base station, inquiring whether the device is to be authenticated;
in response to receiving the request, determining that the device is not included in the list of the plurality of devices; and
sending a response to the base station indicating that the device is not to be authenticated by the base station.

3. The method of claim 1, comprising:
receiving, from the Internet gateway, a request to include the device in the list, wherein the Internet gateway is configured to send the request in response to provisioning the eSIM of the device due to a proximity of the device to the Internet gateway.

4. The method of claim 1, wherein the Internet gateway is configured to provide Internet coverage using a local area network (LAN) communication protocol.

5. The method of claim 4, wherein the device is configured to access the Internet via the Internet gateway and over the LAN communication protocol when the device is within a proximity of the Internet gateway.

6. The method of claim 4, wherein the LAN communication protocol is an Institute of Electrical and Electronics Engineers (IEEE) 802.11 communication protocol.

7. The method of claim 1, wherein the at least one criterion for retaining the ability of the device to authenticate with the base station is met when the device has communicated with the Internet gateway at least a minimum number of times in a preceding duration of time.

8. The method of claim 1, wherein the at least one criterion for denying the device the ability to authenticate with the base station is met when the device has not communicated with the Internet gateway at least a minimum number of times in a preceding duration of time.

9. The method of claim 1, wherein the at least one criterion for retaining the ability of the device to authenticate with the base station is met when the device has communicated with the Internet gateway at least a minimum number of times during specified hours of the day in a preceding duration of time.

10. The method of claim 1, wherein the at least one criterion for denying the device the ability to authenticate with the base station is met when the device has not communicated with the Internet gateway at least a minimum number of times during specified hours of the day in a preceding duration of time.

11. A system, comprising:
an Internet gateway including:
a receiver configured to receive, from a device, a request to provision an embedded subscriber identity module (eSIM) of the device;
a processor configured to:
in response to receiving the request to provision the eSIM of the device, cause the eSIM of the device to be provisioned with a profile, provisioning the eSIM giving the device an ability to authenticate with a base station for communicating, via the base station, over a cellular communication protocol;
after causing the eSIM to be provisioned, determine whether at least one criterion is met by evaluating communications between the device and the Internet gateway that occur after the provisioning of the eSIM, the at least one criterion being for retaining the ability of the device to authenticate with the base station or denying the device the ability to authenticate with the base station; and
in response to determining that the at least one criterion is met, output data indicating that the at least one criterion is met; and
a transmitter configured to transmit the data indicating that the at least one criterion is met; and
a server including:
memory configured to store a list including a plurality of devices able to authenticate with the base station, the list of the plurality of devices including the device;
a receiver configured to receive, from the Internet gateway, the data indicating that the at least one criterion is met; and
a processor configured to:
in response to receiving the data indicating that at least one criterion is met, retain an inclusion of the device in the list of the plurality of devices.

12. The system of claim 11, wherein the processor of the server is configured to:
in response to retaining the inclusion of the device in the list of the plurality of devices, permit authentication of the device by the base station.

13. The system of claim 12, wherein permitting authentication of the device by the base station includes:
receiving a request, from the base station, inquiring whether the device is to be authenticated;
in response to receiving the request, determining that the device is included in the list of the plurality of devices; and
sending a response to the base station indicating that the device is to be authenticated by the base station.

14. The system of claim 11, wherein the receiver of the server is configured to receive, from the Internet gateway, a request to include the device in the list.

15. The system of claim 11, wherein the Internet gateway is configured to send a request to include the device in the list in response to provisioning the eSIM of the device due to a proximity of the device to the Internet gateway.

16. The system of claim 11, wherein the Internet gateway is configured to provide Internet coverage to the device using over a local area network (LAN) communication protocol.

17. The system of claim 16, wherein the receiver of the Internet gateway is configured to receive the request over the LAN communication protocol.

18. The system of claim 16, wherein the LAN communication protocol is an Institute of Electrical and Electronics Engineers (IEEE) 802.11 communication protocol.

19. The system of claim 11, wherein:
the at least one criterion for retaining the ability of the device to authenticate with the base station is met when the device has communicated with the Internet gateway at least a minimum number of times in a preceding duration of time, or
the at least one criterion for denying the device the ability to authenticate with the base station is met when the device has not communicated with the Internet gateway at least a minimum number of times in a preceding duration of time.

20. The system of claim 11, wherein:
the at least one criterion for retaining the ability of the device to authenticate with the base station is met when the device has communicated with the Internet gateway at least a minimum number of times during specified hours of the day in a preceding duration of time, or
the at least one criterion for denying the device the ability to authenticate with the base station is met when the device has not communicated with the Internet gateway at least a minimum number of times during specified hours of the day in a preceding duration of time.

* * * * *